(12) United States Patent
Kakizaki et al.

(10) Patent No.: US 7,542,672 B2
(45) Date of Patent: Jun. 2, 2009

(54) OPTICAL SWITCHING APPARATUS WITH OPTICAL REFLECTION MONITOR AND REFLECTION MONITORING SYSTEM

(75) Inventors: Sunao Kakizaki, Kawasaki (JP); Hideaki Tushima, Tokyo (JP); Sigeki Kitajima, Kawasaki (JP); Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/802,453

(22) Filed: May 23, 2007

(65) Prior Publication Data

US 2007/0223918 A1 Sep. 27, 2007

Related U.S. Application Data

(62) Division of application No. 10/058,781, filed on Jan. 30, 2002.

(30) Foreign Application Priority Data

Aug. 6, 2001 (JP) ............................. 2001-237856

(51) Int. Cl.
*H04B 10/08* (2006.01)
*H04B 17/00* (2006.01)

(52) U.S. Cl. ............................. 398/12; 398/16; 398/19

(58) Field of Classification Search .................. 398/12, 398/19
See application file for complete search history.

(56) References Cited

U.S. PATENT DOCUMENTS

| | | | | |
|---|---|---|---|---|
| 5,077,729 A | * | 12/1991 | Wong | 398/31 |
| 5,251,001 A | * | 10/1993 | Dave et al. | 356/73.1 |
| 5,552,881 A | * | 9/1996 | Jezwinski et al. | 356/73.1 |
| 5,566,263 A | * | 10/1996 | Smith et al. | 385/40 |
| 5,859,936 A | * | 1/1999 | Ishikawa | 385/4 |
| 6,002,501 A | * | 12/1999 | Smith et al. | 398/9 |
| 6,005,694 A | * | 12/1999 | Liu | 398/6 |

(Continued)

FOREIGN PATENT DOCUMENTS

JP 2000-358261 A 12/2000

OTHER PUBLICATIONS

Nordin, R.A. et al. "Advanced optical interconnection technology in switching equipment". Journal of Lightwave Technology, vol. 13, No. 6. Jun. 1995: 987-994.*

*Primary Examiner*—Ken N Vanderpuye
*Assistant Examiner*—David S Kim
(74) *Attorney, Agent, or Firm*—Antonelli, Terry, Stout & Kraus, LLP.

(57) ABSTRACT

A method is provided for detecting an optical reflection position in an optical switching unit by using a measuring system. Multiple switching commands are provided in order to direct a test light to an input port and an output port of the optical switching unit. Status information regarding the internal path of the test light is stored in a memory, along with flags corresponding to the magnitude of reflected light generated when the test light is reflected from an abnormal position along the internal path selected. The status information is stored in the form of a reflection alarm information table where the flags are stored in association with each of the internal paths. A rearmost connection among the optical interconnections in the optical switching unit is detected as an abnormal position based on the reflection alarm information table and the interconnection control table.

4 Claims, 13 Drawing Sheets

U.S. PATENT DOCUMENTS

| | | | |
|---|---|---|---|
| 6,108,074 A * | 8/2000 | Bloom | 356/73.1 |
| 6,177,985 B1 * | 1/2001 | Bloom | 356/73.1 |
| 6,317,255 B1 | 11/2001 | Fatehi et al. | |
| 6,522,434 B1 * | 2/2003 | Jennings et al. | 398/28 |
| 6,529,652 B1 | 3/2003 | Brener | |
| 6,549,692 B1 | 4/2003 | Harel et al. | |
| 6,567,574 B1 | 5/2003 | Ma et al. | |
| 6,591,029 B1 | 7/2003 | Lin et al. | |
| 6,704,508 B1 | 3/2004 | Asahi | |
| 6,714,701 B1 * | 3/2004 | Hazon et al. | 385/18 |
| 6,792,177 B2 | 9/2004 | Welsh et al. | |
| 6,862,380 B2 * | 3/2005 | Chaudhuri et al. | 385/17 |
| 6,950,215 B2 * | 9/2005 | Fant et al. | 359/16 |

\* cited by examiner

|  | CB1 | | CB3 | | CB5 | |
|---|---|---|---|---|---|---|
|  | INPUT PORT | OUTPUT PORT | INPUT PORT | OUTPUT PORT | INPUT PORT | OUTPUT PORT |
| PORT 1 | ABNORMAL | ABNORMAL | NORMAL | NORMAL | NORMAL | NORMAL |
| PORT 2 | NORMAL | NORMAL | NORMAL | NORMAL | NORMAL | NORMAL |
| ⋮ | ⋮ | ⋮ | ⋮ | ⋮ | ⋮ | ⋮ |
| PORT N | NORMAL | NORMAL | NORMAL | NORMAL | NORMAL | NORMAL |

|  | CB2 | | CB4 | | CB6 | |
|---|---|---|---|---|---|---|
|  | INPUT PORT | OUTPUT PORT | INPUT PORT | OUTPUT PORT | INPUT PORT | OUTPUT PORT |
| PORT 1 | NORMAL | NORMAL | NORMAL | NORMAL | NORMAL | NORMAL |
| PORT 2 | NORMAL | NORMAL | NORMAL | NORMAL | NORMAL | NORMAL |
| ⋮ | ⋮ | ⋮ | ⋮ | ⋮ | ⋮ | ⋮ |
| PORT N | NORMAL | NORMAL | NORMAL | NORMAL | NORMAL | NORMAL |

FIG. 13B

|  | CB1 | | CB3 | | CB5 | |
|---|---|---|---|---|---|---|
|  | INPUT PORT | OUTPUT PORT | INPUT PORT | OUTPUT PORT | INPUT PORT | OUTPUT PORT |
| PORT 1 | ABNORMAL | ABNORMAL | ABNORMAL | NORMAL | NORMAL | NORMAL |
| PORT 2 | NORMAL | NORMAL | NORMAL | NORMAL | NORMAL | NORMAL |
| ⋮ | ⋮ | ⋮ | ⋮ | ⋮ | ⋮ | ⋮ |
| PORT N | NORMAL | NORMAL | NORMAL | NORMAL | NORMAL | NORMAL |

|  | CB2 | | CB4 | | CB6 | |
|---|---|---|---|---|---|---|
|  | INPUT PORT | OUTPUT PORT | INPUT PORT | OUTPUT PORT | INPUT PORT | OUTPUT PORT |
| PORT 1 | NORMAL | NORMAL | NORMAL | NORMAL | NORMAL | NORMAL |
| PORT 2 | NORMAL | NORMAL | NORMAL | NORMAL | NORMAL | NORMAL |
| ⋮ | ⋮ | ⋮ | ⋮ | ⋮ | ⋮ | ⋮ |
| PORT N | NORMAL | NORMAL | NORMAL | NORMAL | NORMAL | NORMAL |

FIG. 14

| WITHIN CB1 | | CB-TO-CB | WITHIN CB3 | | CB-TO-CB | WITHIN CB5 | |
|---|---|---|---|---|---|---|---|
| INPUT PORT | OUTPUT PORT | | INPUT PORT | OUTPUT PORT | | INPUT PORT | OUTPUT PORT |
| 1 → 1 | | CB1 OUTPUT PORT 1 → CB3 INPUT PORT 1 | 1 → 1 | | CB3 OUTPUT PORT 1 → CB5 INPUT PORT 1 | 1 → 1 | |
| . . . | | . . . | . . . | | . . . | . . . | |
| N → 1 | | CB1 OUTPUT PORT N → CB4 INPUT PORT 1 | N → 1 | | CB3 OUTPUT PORT N → CB6 INPUT PORT 1 | N → N | |
| WITHIN CB2 | | CB-TO-CB | WITHIN CB4 | | CB-TO-CB | WITHIN CB6 | |
| INPUT PORT | OUTPUT PORT | | INPUT PORT | OUTPUT PORT | | INPUT PORT | OUTPUT PORT |
| 1 → N | | CB2 OUTPUT PORT 1 → CB3 INPUT PORT N | 1 → 1 | | CB4 OUTPUT PORT 1 → CB5 INPUT PORT N | 1 → 1 | |
| . . . | | . . . | . . . | | . . . | . . . | |
| N → 1 | | CB2 OUTPUT PORT N → CB4 INPUT PORT N | N → 1 | | CB4 OUTPUT PORT N → CB6 INPUT PORT N | N → N | |

OPTICAL SWITCHING APPARATUS WITH OPTICAL REFLECTION MONITOR AND REFLECTION MONITORING SYSTEM

CROSS-REFERENCE TO RELATED APPLICATION

This application is a Divisional application of application Ser. No. 10/058,781, filed Jan. 30, 2002, which claims priority from Japanese patent application JP 2001-237856, filed on Aug. 6, 2001, the contents of which are incorporated herein by reference in their entirety.

FIELD OF THE INVENTION

The present invention relates to the structure of an optical switching system including an optical reflection measuring system. More particularly, the invention relates to an optical switching system that enables immediate detection and notification of reflected light occurring on a plurality of optical signal transmission paths, and an optical reflection measuring system for measuring the reflected light.

BACKGROUND OF THE INVENTION

In order to keep up with rapid increases in data traffic as typified by the Internet and in demands for multimedia communications combining image, voice, and data, the speed and capacity of transmission paths and communication nodes that form networks are being improved, and optical communication systems using optical fibers and optical signals are being brought into use. In addition, as an alternative to conventional communication equipment in which optical signals are processed through optical-to-electrical conversion, optical signal processors such as the optical cross-connect (referred to as an OXC below) and optical add drop multiplexer (referred to as an OADM below), in which switching operations such as transmission path switching and circuit switching are carried out without such conversion, are under consideration for practical use.

The OXCs and OADMs mentioned above are configured by selectively using optical amplifiers, optical couplers, optical isolators and other optical components as required and combining (interconnecting) them with optical fibers and connectors. As can typically be seen in optical switches and other optical devices, it is difficult to increase their capacity as matters now stand, so high-capacity optical switching systems are generally implemented by combining a number of low-capacity optical components. A higher-capacity optical switch, for example, can be implemented by multistage-connecting low-capacity optical switches, such as 2×2 or 8×8 optical switches that are already in commercial use.

As described above, an optical switching system is implemented by interconnecting a number of optical components and optical fibers with connectors and splices, so optical signals passing through the system suffer degradation due to optical loss in the components, and to various conditions at the connecting points, such as dirt, axial deviation, and open connection ends, which may give rise to the departure of part of an optical signal from the proper course. In particular, reflection in the direction opposite to the proper direction of propagation causes degradation of the optical signal.

Some optical signal processors and optical components that detect optical reflection have already been introduced. optical switches such as the one disclosed in JP-A-358261/2000 have been suggested, which comprises a reflected light detector at the input terminal thereof and a reflector at the output terminal thereof, and checks internal paths by confirming that an optical signal input from the input terminal is reflected back to the input terminal.

In optical signal processors configured by combining a plurality of optical components such as optical amplifiers, optical switches, optical couplers, and optical isolators as mentioned above, light reflected at a connection point of another optical component, resulting in multiply reflected light.

This multiply reflected light becomes a delayed version of the intended optical signal, so it interferes with the intended optical signal (causing degradation of the optical signal). Recent studies by the present inventor(s) have resulted in the discovery that degradation of optical signals caused by such multiply reflected light has a major effect on the operation of optical signal processors configured by combining a plurality of optical components.

More specifically, it was discovered that, in the optical switching system 300 in FIG. 2, when an optical (digital) signal 370 transmitted through optical fibers 310-1 to 310-N proceeds from an input port 330-N to an output port 340-N, multiply reflected light 375 that has been delayed at a reflecting point 1 indicated by reference numeral 350 and a reflecting point 2 indicated by reference numeral 360 may superimpose itself on the optical signal 370, causing coherent crosstalk, or interference between the optical signal and the multiply reflected light may form a resonator that is not actually present in the system. If a wavelength multiplexed signal is processed optically in an optical signal processor configured by combining a plurality of optical components, various types of optical degradation due to multiply reflected light may occur on a random basis: for example, (1) wavelength-dependent variations in optical-loss characteristics, (2) occurrence of signal amplitude noise due to wavelength fluctuations of an intended signal, and (3) wavelength dispersion. It has been found that these effects have a major effect on the operation of the system.

Therefore, practical utilization of an optical signal processor configured by combining a plurality of optical components requires configurations and methods by which reflected light arising in the processor during assembly, installation, or operation thereof can be detected reliably and immediately to enable alteration of optical signal paths and recovery actions (maintenance) such as replacement and repair of components, thereby improving the reliability, availability, and serviceability of the processor.

The document mentioned above describes a configuration for detecting singly reflected light, but it does not provide configurations and methods for implementing systems that address the problems of multiply reflected light in an optical signal processor configured by combining a plurality of optical components.

SUMMARY OF THE INVENTION

An object of the present invention is to solve the above problems of optical switching systems configured by combining a plurality of optical components, by providing an optical switching system with functions enabling reliable and immediate detection and notification of reflected light, and providing methods enabling reliable and immediate detection and notification of reflected light arising in an optical switching system.

Another object of the present invention is to provide a more highly reliable, available, and serviceable optical switching system by providing a simplified configuration enabling reliable and immediate detection and notification of reflected light arising therein, thus enabling the replacement of optical signal paths and recovery actions (maintenance) such as replacement and repair of the optical components.

Another object of the present invention is to provide a method comprising simplified procedural steps for reliable and immediate detection and notification of reflected light arising in an optical switching system, thereby improving the reliability, availability, and serviceability thereof.

Another object of the present invention is to provide an optical switching device with a plurality of optical input ports and a plurality of optical output ports, comprising optical reflection monitors with optical reflection monitoring functions provided between the plurality of optical input ports and the plurality of optical output ports.

Another object of the present invention is to provide an optical switching system configured by multistage-connecting a plurality of optical switching devices, wherein each optical switching device comprises a plurality of optical reflection monitors having optical reflection monitoring functions, and the optical reflection monitors can detect reflected light on paths followed by optical signals input to the optical switching device and use the optical reflection monitoring function to locate the point of reflection on the path.

Another object of the present invention is to provide a reflected light measuring system comprising a terminal with reflected light measuring software, an optical switching system including optical switching units that control switching of optical signals, reflected light meters that measure reflected light of optical signals, and port selectors that select the input path of an optical signal input to the optical switching unit, wherein the software can be executed to control the operation of the reflected light meters, port selectors, and optical switching system, and thereby measure the reflected light of the optical signal to locate reflection positions.

Another object of the present invention is to provide an optical switching method capable of detecting reflected light, comprising steps of performing settings for switching of an optical switch and storing optical interconnection relationships; selecting a circuit board equipped with the optical switching device according to a command from an operation control unit and storing optical reflection alarm information; and locating a position at which reflection is occurring according to the stored optical interconnection relationships and optical reflection alarm information.

Another object of the present information is to provide a method of setting optical switching information and optical reflection alarm information in an optical switching device, comprising steps in which a switching control unit in the optical switching device performs settings for switching of an optical switch and settings of a switching information register, and a CPU selects an optical reflection monitoring circuit, then transfers a signal from the optical reflection monitoring circuit, after analog-to-digital conversion, to a monitoring and control unit, and sets an optical reflection monitoring register therein.

Another object of the present invention is to provide a reflection position measuring method using an optical reflection measuring system in an optical switching unit, comprising steps of transmitting a switching command to a port selector under control of a portable terminal; transmitting the switching command to an optical switching unit under control of the portable terminal; requesting a measured value from a reflected light meter; and searching in an optical reflection alarm control table and an interconnection control table to determine an abnormal alarm position.

Another object of the present invention is to provide an optical switching device comprising a plurality of optical reflection monitors with optical reflection monitoring functions disposed between a plurality of optical input ports and a plurality of optical output ports, that receives an optical signal input through an optical input port and uses the optical reflection monitors to monitor reflected light arising at certain points along the transmission paths between the plurality of optical input ports and the plurality of optical output ports, thereby enabling immediate notification of abnormal conditions in connecting cables along the optical transmission paths.

BRIEF DESCRIPTION OF THE DRAWINGS

FIG. 3 is a drawing showing an example in which a reflection alarm is issued in an optical switching system with multistage-connected optical switching devices according to the present invention;

FIGS. 13A and 13B are drawings showing an optical reflection alarm information table according to the present invention; and FIG. 14 is a drawing showing an interconnection control table according to the present invention.

DETAILED DESCRIPTION OF THE PREFERRED EMBODIMENT

Figure 1:
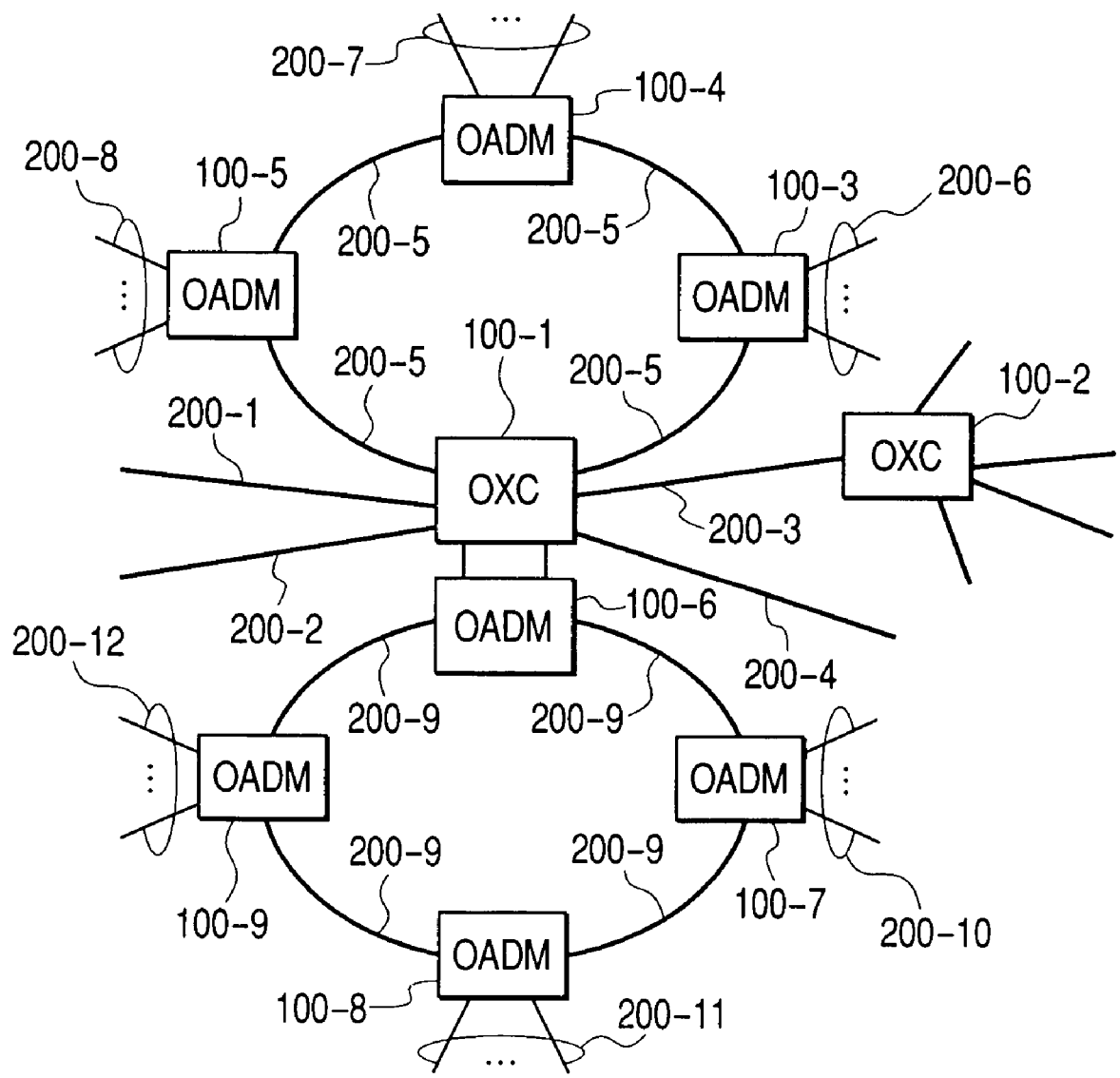
FIG. 1 is a drawing showing an example of the structure of a communication network equipped with an optical switching system according to the present invention.
Figure 2:
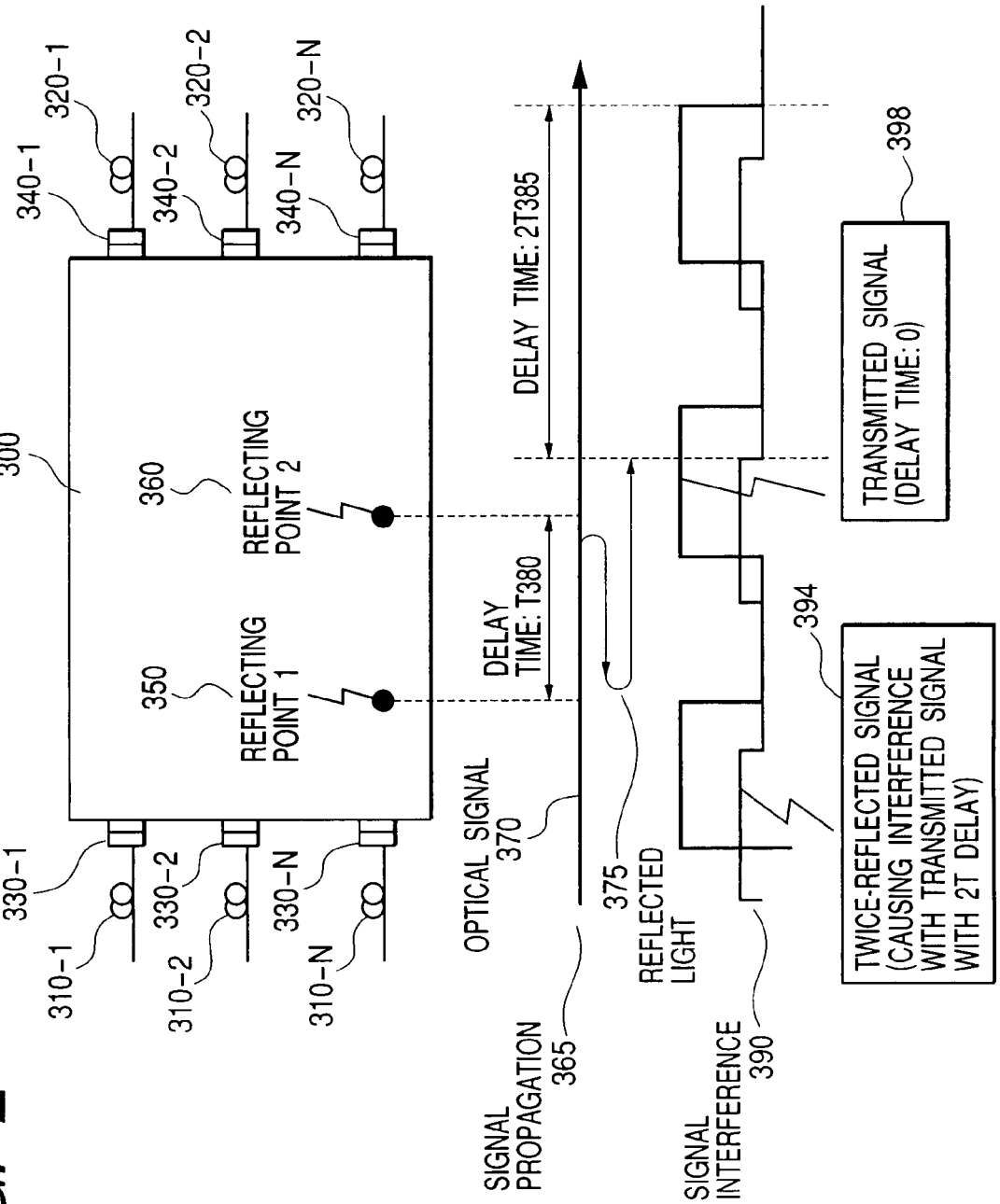
FIG. 2 is a drawing explaining the effects of reflected light arising in optical switching systems.

Embodiments illustrating the structure of optical signal switching apparatus according to the present invention and the use thereof will be described with reference to the attached drawings, in which like parts are indicated by like reference characters in FIGS. 3 and 4. FIG. 1 is a drawing of a network configuration that will be used as an example of a communication network adopting optical signal switching apparatus according to the present invention. Optical signal switching apparatus 100 (100-1 to 100-9) is interconnected with optical fibers 200 (200-1 to 200-12, and others) to form a communication network. A more specific embodiment includes a pair of optical cross-connects (each referred to as an OXC below: 100-1 and 100-2) that switch and output multiplexed optical signals received from the optical fibers (200-1 to 200-5 and others) to appropriate destination optical fibers, and optical add drop multiplexers (each referred to as an OADM below: 100-3 to 100-9) that separate an optical signal from or insert an optical signal into the multiplexed optical signals received from the optical fibers (200-5 and 200-9) as required by the devices connected thereto and transmit and receive optical signals to and from the optical fibers (200-6 to 8, and 200-10 to 12). A communication network is constructed by connecting the optical signal switching apparatus according to the present invention and these optical fibers having proper multiplexing degrees and transmission rates, as required.

An optical signal switching system according to the present invention simplifies network construction by enabling proper selective use of components to construct flexible communication networks capable of supporting various optical signal transmission rates and multiplexing degrees. For example, the system can handle both optical signals with transmission rates exceeding the STM-0 (51.84 MHz) level established by an ITU-T Recommendation or unmodulated (dc) light, and places no limitations on the presence or absence of wavelength division multiplexing and the number of multiplexed wavelengths. An optical signal switching system providing 8 paths with 32 multiplexed wavelengths requires an OXC capable of 256×256 switching. In this case, it becomes impossible to implement a compact signal switching system by using electronic circuits, so the present invention provides a significant effect.

Figure 3:
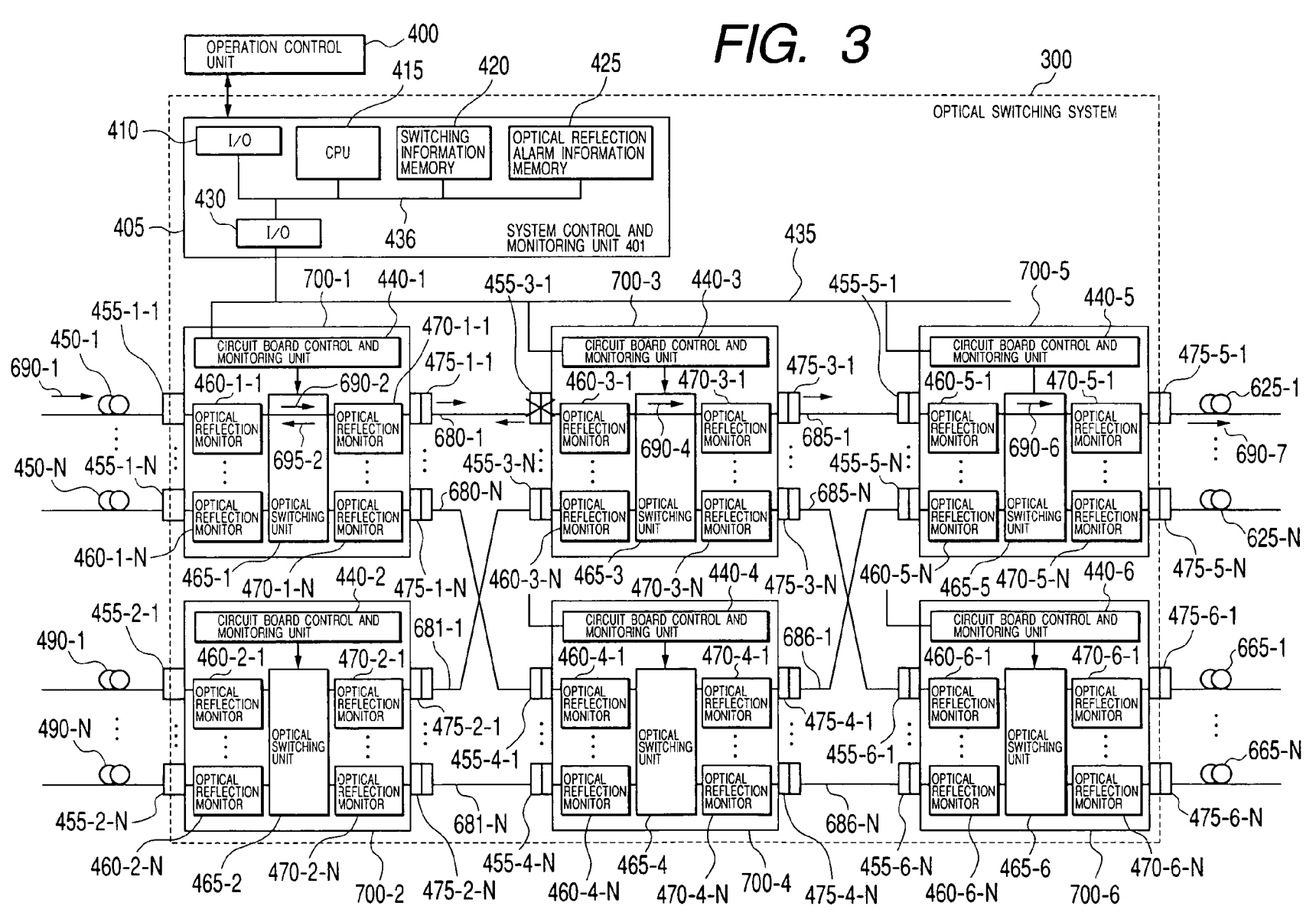
Figure 4:
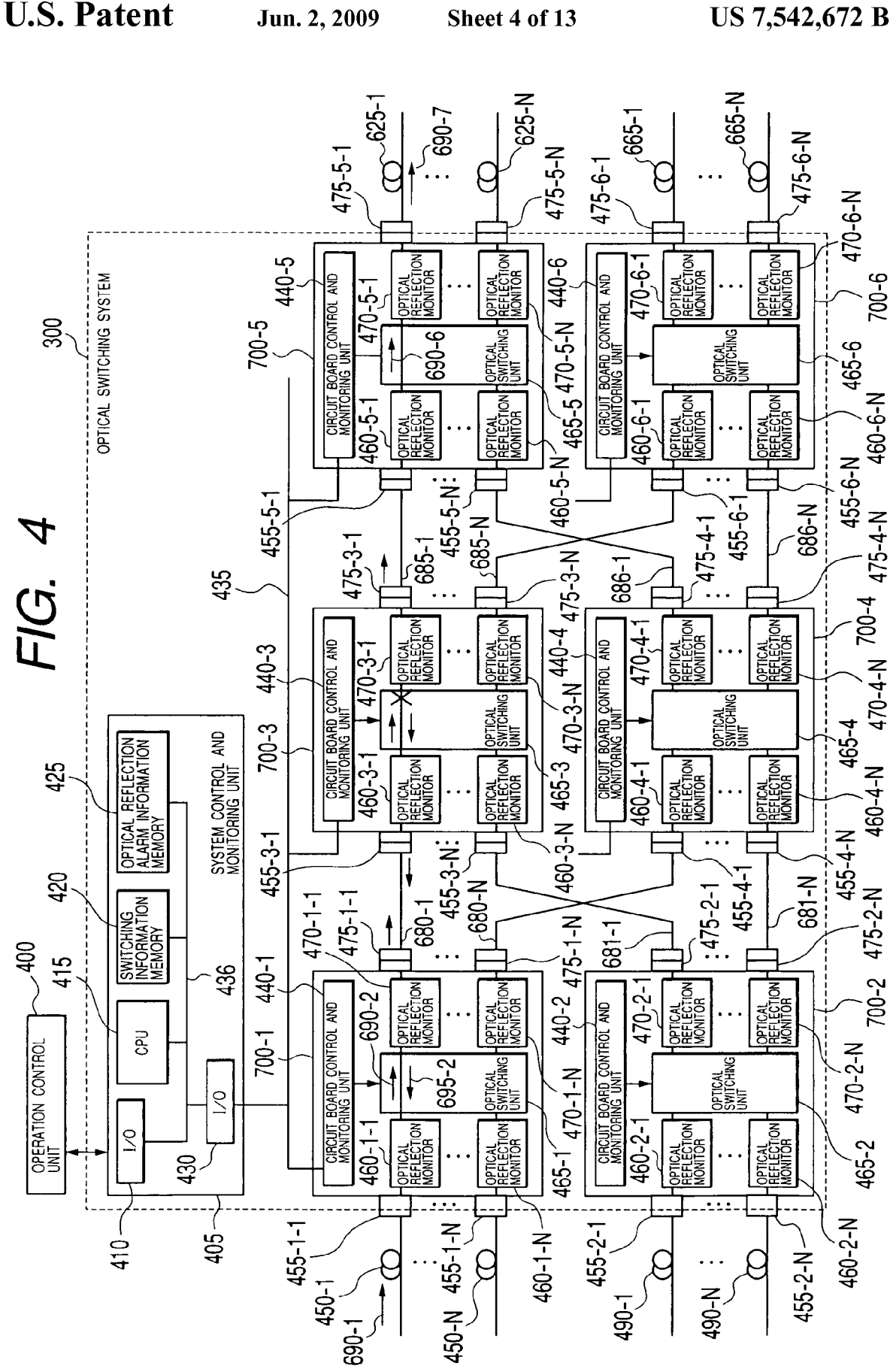
FIG. 4 is a drawing showing another example in which a reflection alarm is issued in an optical switching system with multistage-connected optical switching devices according to the present invention.

FIGS. 3 and 4 are block diagrams of an optical switching system 300 with multistage-connected optical switches.

A system control and monitoring unit 405 comprises an interconnecting structure with a bus 436, an I/O unit 410 that communicates with an operation control unit 400, a CPU 415 that controls the overall system control and monitoring unit 405, a switching information memory 420, an optical reflection alarm information memory 425, and an I/O unit 430 that interconnects multistage-connected circuit boards (CBs) 700-1 to 700-6 with conducting wire 435. Each of the CBs includes a circuit board control and monitoring unit 440-N that controls and monitors the CB, an optical reflection monitor 460-X-N that monitors reflected light in the CB, and an optical switching unit 465-N that switches optical paths in the CB. The switching information memory unit 420 stores an interconnection control table shown in FIG. 14; the optical reflection alarm information memory 425 stores an optical reflection alarm control table shown in FIGS. 12(a) and (b).

The CPU 415 accesses these control tables to control switching and other processing of the circuit boards 700-1 to 700-6. The operation control unit 400 collects circuit board status information from the multistage-connected circuit boards 700-1 to 700-6, switching status information from the optical switching unit, alarm information provided from the optical reflection monitors when reflection occurs, and other information through the I/O unit 430 and relays switching settings and other commands to each of the circuit boards. The multistage-connected circuit boards 700-1 to 700-6 are used for optical transmission and switching. The multistage connection structure includes several redundant paths, providing alternative detour paths in the case of a failure in a circuit board.

In the example of the system structure shown in FIGS. 3 and 4, an optical signal 690-1, for example, is transmitted on a transmission path sequentially from an input port 455-1-1, through the optical switching unit 465-1, an output port 475-1-1 of the circuit board 700-1, an input port 455-3-1, the optical switching unit 465-3, an output port 475-3-1 of the circuit board 700-3, an input port 455-5-1, and the optical switching unit 465-5, to an output port 475-5-1 of the circuit board 700-5.

In the example of FIG. 3, when there is a reflecting point in the input port 455-3-1 of CB 700-3 and reflected light is monitored in optical reflection monitors 470-1-1 and 460-1-1, a value indicating an abnormal condition is written into both ingress and egress columns under CB1 in the optical reflection alarm control table shown in FIG. 13A. Based on the monitoring results, maintenance or other personnel can replace optical cables and circuit boards with new ones at the position where the reflection is occurring.

Figure 5:
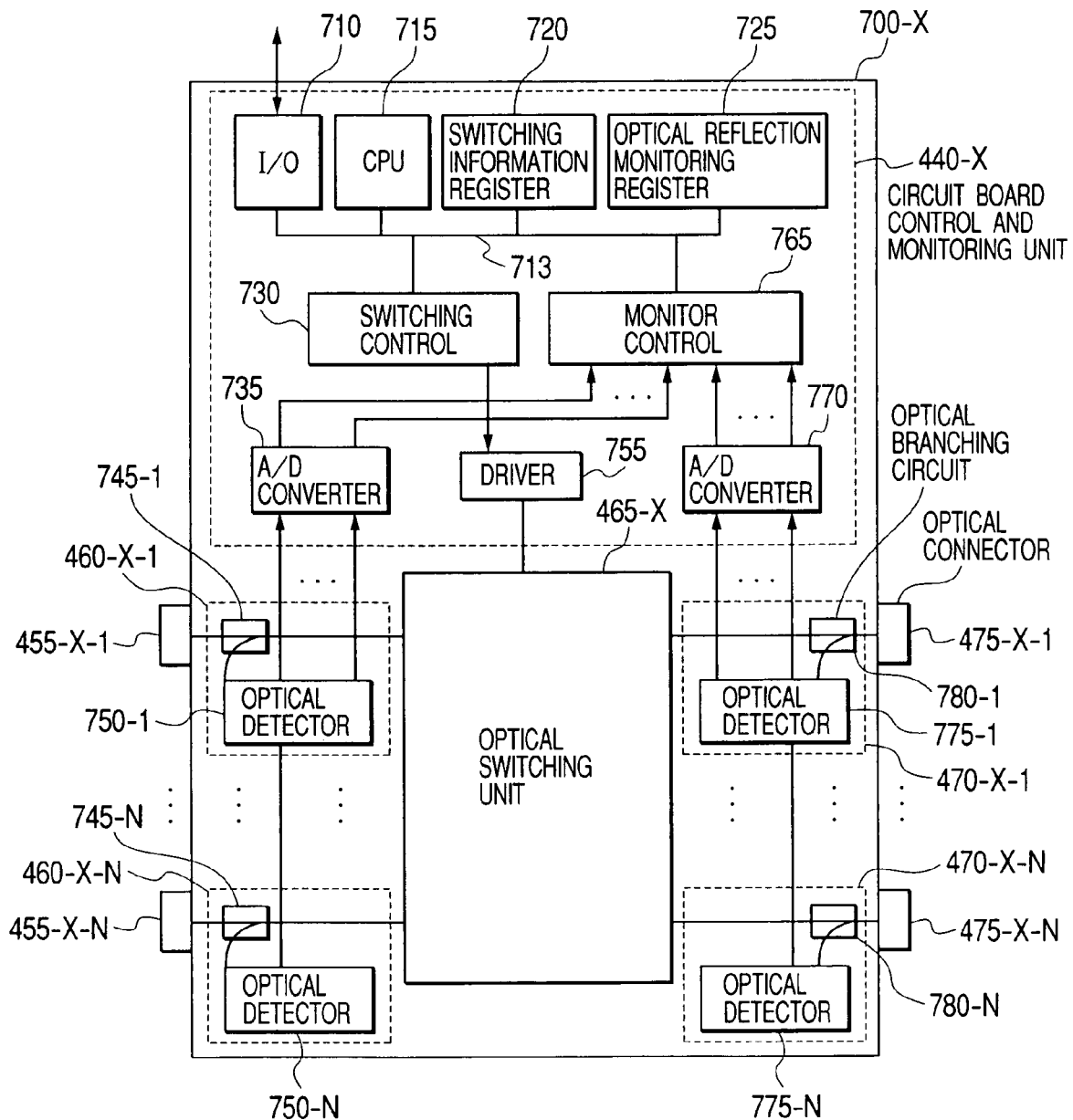
FIG. 5 is a drawing showing an exemplary block diagram of an optical switching device according to the present invention.

FIG. 5 is a block diagram showing the details of one of the circuit boards 700-1 to 700-6 included in the optical switching system described with reference to FIGS. 3 and 4. In FIG. 5, an I/O unit 710, a CPU 715, a switching information register unit 720, an optical reflection monitoring register 725, a switch control unit 730 that controls switching of switches in an optical switching unit 465-X, a monitoring control unit 765, analog-to-digital (A/D) converters 735 and 770, and a driver 755 that drives the optical switching unit are interconnected via a bus 713, forming a circuit board control and monitoring unit 440-X that is controlled by the CPU 715. The monitoring control unit 765 monitors digital signals obtained through detection of reflected light in the optical detectors 750-1 to 750-N and 775-1 to 775-N and A/D conversion of the detected reflected light in A/D converters 735 and 770.

The optical detectors 750-1 to 750-N and 775-1 to 775-N monitor reflected light of an optical signal that has been branched out from the optical signal in optical branching circuits 745-1 to 745-N and 780-1 to 780-N, each of which comprises an optical coupler and other optical components, and transmits it to the A/D converters 735 and 770 as a monitored signal. The behaviors of the switching information register unit 720 and the optical reflection monitoring register unit 725 will be described later with reference to the flow diagram shown in FIG. 11.

The driver 755 and the switching control unit 730 set optical transmission paths from the input ports 455-X-1 to 455-X-N to the output ports 475-X-1 to 475-X-N of the optical switching units 465-X.

Circuits 460-X-1 to 460-X-N and 470-X-1 to 470-X-N (shown in the boxes enclosed with a broken line in FIG. 5), which are combinations of optical branching circuits 745-1 to 745-N and 780-1 to 780-N and optical detectors 750-1 to 750-N and 775-1 to 755-N respectively correspond to the optical reflection monitor circuits (or optical reflection monitors) 460-1-1 to 460-6-N and 470-1-1 to 470-6-N in each circuit board shown in FIGS. 3 and 4. Each optical reflection monitor can detect reflected light on an optical transmission path followed by an optical signal input to the optical switching device mounted on the circuit board, and locate the reflecting positions along the path.

Figure 7:
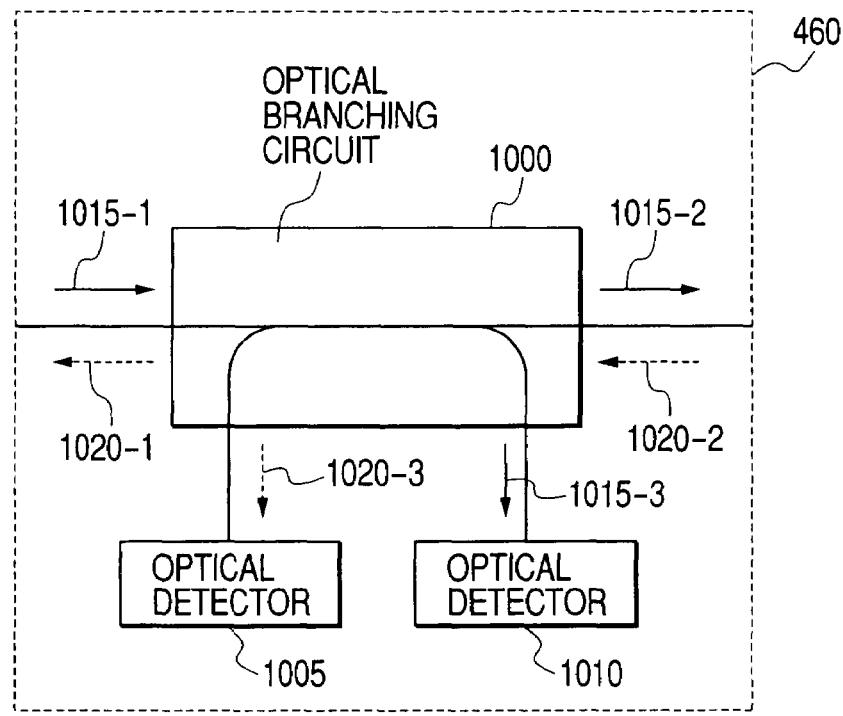
FIG. 7 is a drawing showing an example of the structure of an optical branching unit and optical detector in an optical switching device according to the present invention.
Figure 8:
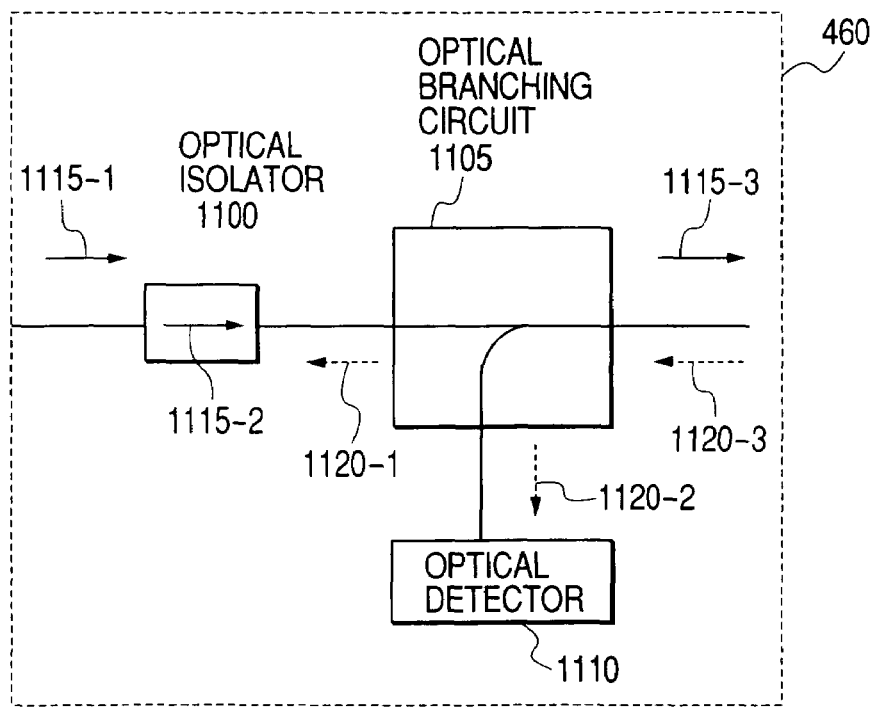
FIG. 8 is a drawing showing an example of the structure of an optical branching unit, optical isolator, and optical detector in an optical switching device according to the present invention.
Figure 9:
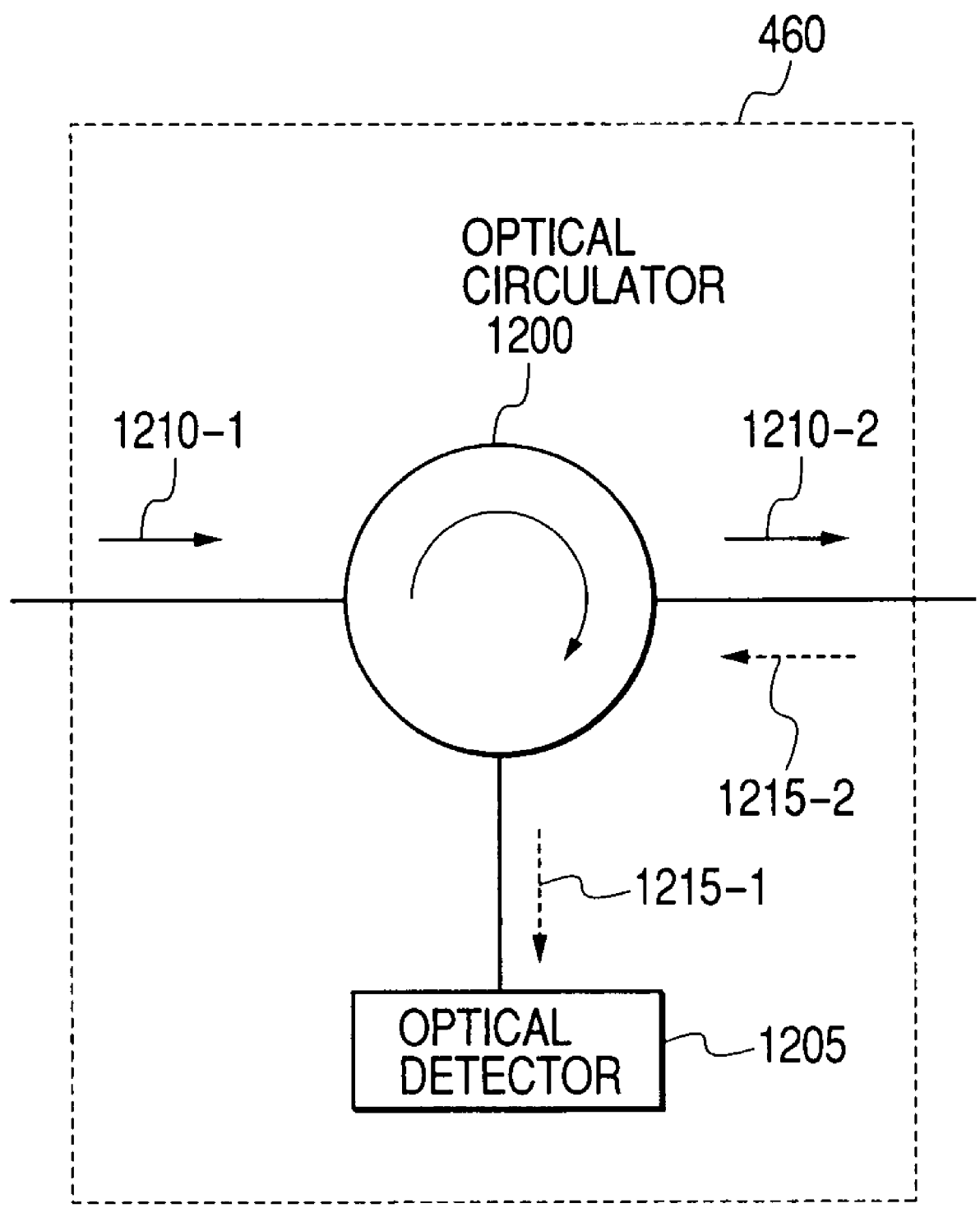
FIG. 9 is a drawing showing an example of the structure of an optical circulator and optical detector in an optical switching device according to the present invention.

FIGS. 7 to 9 show specific examples of the structure of the optical detector 750 and an optical branching circuit that form the optical reflection monitor connected to the optical switching devices mounted on CB 700 in FIG. 5 described above.

The optical reflection monitor shown in FIG. 7 comprises an optical detector 1010 for monitoring optical power of an optical signal 1015-1 input to an optical branching circuit 1000 (provided to separate the optical signal and reflected light thereof), and an optical detector 1005 that monitors reflected light 1020-1 or 1020-2 of the optical signal 1015-1 or 1015-2 at the optical connector. This structure makes it possible to determine the amount of reflection loss accurately as the ratio of input power to reflected light power.

FIG. 8 shows an optical reflection monitor with a structure comprising a combination of an optical isolator 1100, an optical branching circuit 1105 that separates reflected light of optical signals, and an optical detector 1110. The optical isolator 1100 allows an optical signal 1115-1 to pass but blocks the reflected light 1120-1 that arises at the optical connector. Providing the optical isolator 1100 can prevent reflected light from proceeding beyond the optical detector 1110 (toward the left in the drawing). The optical detector 1110 monitors reflected light 1120-3 as described with reference to FIG. 7.

FIG. 9 shows an optical reflection monitor with a structure comprising a combination of an optical circulator 1200 that allows the passage of an optical signal and circulates or blocks reflected light thereof and an optical detector 1205. An optical signal 1210-1 is passed through the optical circulator 1200 to the optical connector and other components, while reflected light 1215-2 that arises in the optical connector is circulated clockwise in the optical circulator 1200 and transmitted to the optical detector 1205 to be monitored. The optical circulator 1200 has an advantage in that it produces less reflection loss than occurs in the optical coupler used in the optical branching circuit described above, and consequently never weakens the reflected light power.

Figure 10:
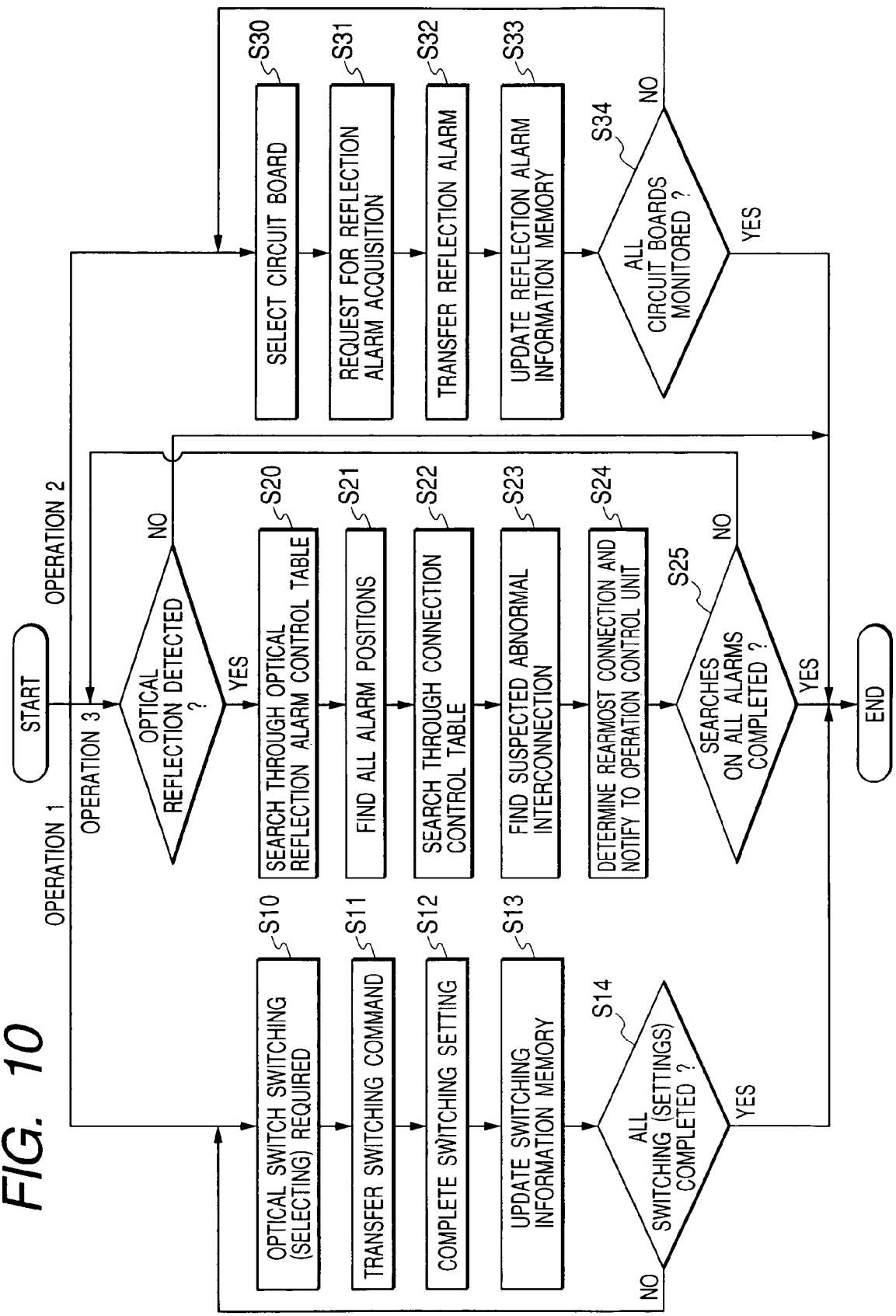
FIG. 10 is a diagram showing the flow of operations based on the system configuration shown in FIGS. 3 and 4 according to the present invention.

FIG. 10 is a flow diagram showing the procedures for switching operations, collecting optical reflection alarms, and locating abnormal conditions. OPERATION 1 shows a procedure of switching operation, OPERATION 2 shows a procedure for collecting optical reflection alarms, and OPERATION 3 shows a procedure of finding and calculating optical reflection alarm positions and other operations.

In OPERATION 1, the CPU 415 performs settings for switching optical switches as commanded by the operation control unit 400 in FIGS. 3 and 4 (Step S10); transfers the switching command to an optical switching device mounted on one of the multistage-connected circuit boards concerned (Step S11); and completes required setting for the switching of the optical switch (Step S12). Then the CPU 415 updates the contents of the interconnection control table shown in FIG. 14, which is stored in the switching information memory 420, in accordance with switching information transferred from the optical switching device (Step S13), and if all settings for switching of optical switches required are completed (Ster S14), terminates OPERATION 1, or otherwise, returns to Step S10 and repeats the switching setting operation in accordance with the switching command from the operation control unit 400.

In OPERATION 2, the CPU 415 selects a circuit board (CB) (Step S30) and requests optical reflection alarm acquisition (Step S31); then the optical reflection alarm information is transferred from an optical switching device mounted on the 15 selected CB to the operation control unit 400 through the CPU 415 (Step S32). At the same time, the contents of the optical reflection alarm information table shown in FIGS. 13A and 13B, which is stored in the optical reflection alarm information memory 425, are updated (Step S33). For example, if there is an optical 20 reflection alarm, "1" is written into the optical reflection information table in the optical reflection alarm information memory 425 to indicate the presence of an optical reflection alarm. If the monitoring of all circuit boards in OPERATION 2 is completed (Step S34), the CPU 415 terminates OPERATION 2; otherwise, it returns to Step S30 to repeat the procedure.

Finally, in OPERATION 3, if no optical reflection alarm has been generated through OPERATIONs 1 and 2, the CPU 415 terminates the operation. If there is an optical reflection alarm, the optical reflection alarm control table shown in FIGS. 13A and 13B is searched (Step S20), all alarm positions are detected (Step S21), the interconnection control table shown in FIG. 14 is searched (Step S22), a suspected abnormal optical interconnection path is selected (Step S23), the rearmost interconnection of the connecting path on which reflected light is arising is determined and the reflection position is reported to the operation control unit 400 (Step S24). If the rearmost interconnections for all optical reflection alarms have been found and reported (Step S25), then the CPU 415 terminates operations in OPERATION 3; otherwise, it repeats the procedure of OPERATION 3.

Figure 11:
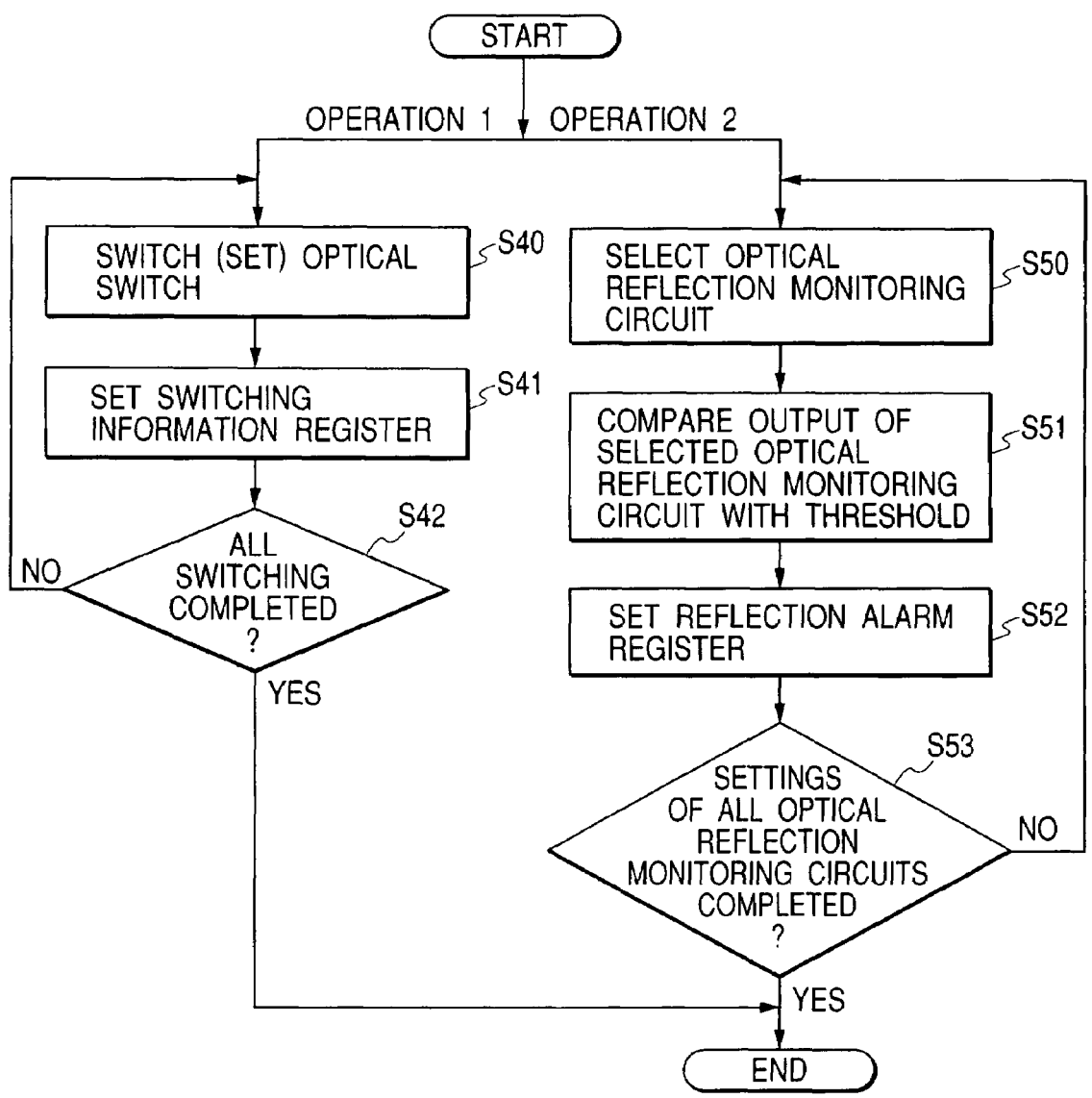
FIG. 11 is a flow diagram of operations based on the exemplary structure shown in FIG. 4 according to the present invention.

FIG. 11 is a flow diagram of the operation of the CPU 715, the switching control unit 730, the monitoring and control unit 765, the switching information register unit 720, and the optical reflection monitoring register 725 in FIG. 5 showing the details of each circuit board in the system structure shown in FIGS. 3 and 4.

In OPERATION 1, the switching control unit 730 performs settings for required switching of an optical switch in an optical switching unit (Step S40), the CPU 715 sets the switching information register unit 720 in accordance with the switching information (Step S41), and if switching for all the settings is completed (Step S42), then terminates the operation, or otherwise, returns to Step S40 and repeats the procedure. These operations and settings can be executed directly by the system control and monitoring unit 405.

In OPERATION 2, the CPU 715 selects an optical reflection monitoring circuit (Step S50); compares an A/D-converted output value from a designated optical reflection monitoring circuit to a threshold stored in the CPU 715, the monitoring and control unit 765, or the optical reflection monitoring register 725 (Step S51); writes "1" for an abnormal condition and "0" for a normal condition into a memory in the monitoring control unit 765 and sets the optical reflection monitoring register 725 (Step S52); and if the settings for all the optical reflection monitoring circuits are completed (Step S53), then terminates OPERATION 2, or otherwise, returns to Step S50 and repeats the procedure.

FIGS. 13A and 13B show optical reflection alarm control tables. The tables are stored in the optical reflection alarm information memory 425 shown in FIGS. 3 and 4, and indicate the presence or absence of reflected light arising at the ingress and egress ports 1 to N of each of the circuit boards (CB1 to CB6) on which the multistage-connected optical switching units are mounted in the system structures (FIGS. 3 and 4) of the optical switching system 300, as abnormal or normal condition information. In these tables, CB1, CB3, and CB5 correspond to circuit boards 700-1, 700-3, and 700-5; CB2, CB4, and CB6 correspond to circuit boards 700-2, 700-4, and 700-6.

The condition information (normal or abnormal) at the input and output ports 1 to N of each circuit board is monitored in the CPU 415 shown in FIGS. 3 and 4, and switching of the optical switching unit in the circuit board is carried out in accordance with the condition information. The control table shown in FIG. 13A indicates that there is a reflecting point at the input port 455-3-1 of circuit board 700-3 in the system structure in FIG. 3 and the reflected light has been monitored. The control table shown in FIG. 13B indicates that there is a reflecting point in the optical switching unit 465-3 of circuit board 700-3 in the system structure in FIG. 4 and the reflected light has been monitored.

The interconnection control table in FIG. 14 is stored in the switching information memory 420 shown in FIGS. 3 and 4, which indicates the input-to-output port interconnection information within each of the circuit boards CB1 to CB6 described with reference to FIGS. 13A and 13B and CB-to-CB port interconnection information. For example, the table shows interconnection between input port 1 and output port 1 and between input port N and output port 1 within CB1. The CB-to-CB interconnection column indicates CB1-to-CB3 or CB4, CB2-to-CB3 or CB4, CB3-to-CB5 or CB6, and CB4-to-CB5 or CB6 interconnection information.

Interconnecting conditions indicated by the interconnection control table conform to the optical cabling of CB1 to CB6 shown in FIGS. 3 and 4. The content of this interconnection control table is also monitored by the CPU 415 shown in FIGS. 3 and 4 as is the case with the optical reflection alarm information table shown in FIGS. 13A and 13B.

In the structure shown in FIG. 3, it is possible to use the optical reflection alarm control table (FIG. 13A) and the interconnection control table (FIG. 14) in accordance with the flow diagram (FIG. 10) to locate reflecting points. Specifically, FIG. 13A indicates an alarm from the optical reflection monitors 460-1-1 and 470-1-1 of CB1 and no alarm from the optical reflection monitor 460-3-1. Reference to the interconnection control table in FIG. 14 shows that there may be abnormal conditions in the optical fiber from CB1 output port 1 to CB3 input port 1 or in the connectors of this optical fiber. In the case of FIG. 4, the table in FIG. 13B also indicates an alarm from optical reflection monitor 460-3-1 of CB3. Reference to the interconnection control table in FIG. 14 shows there may be an abnormal condition in the connection path from input port 1 to output port 1 within CB3. In this way, the optical reflection alarm control table and interconnection control table can be used in accordance with the procedure of the flow diagram shown in FIG. 10 to identify failures. As a result of identifying the failures, alarms can be issued and signals can be switched over to paths that are still normal.

Figure 6:
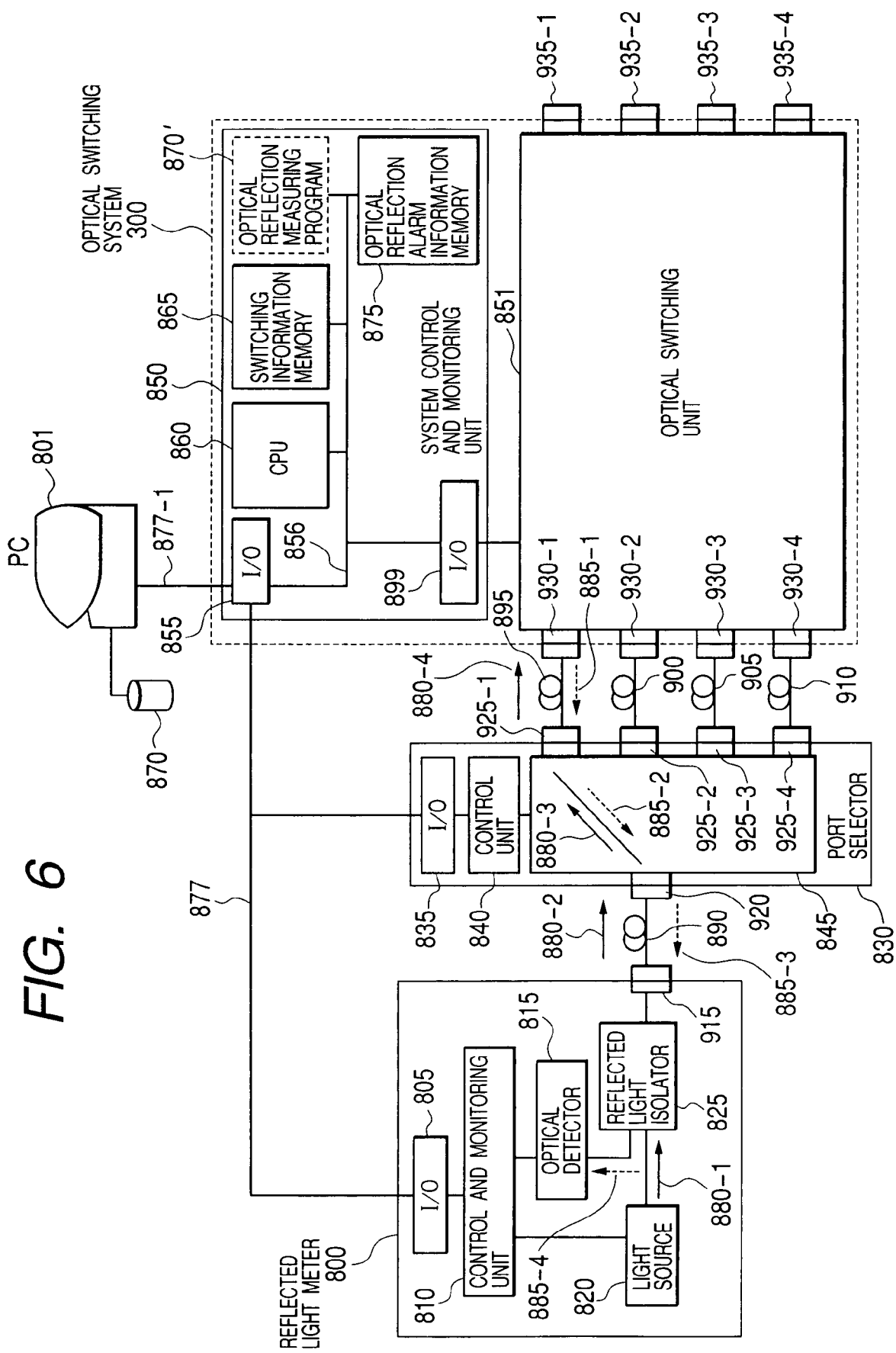
FIG. 6 is a block diagram of an optical switching system with an external measuring instrument for measuring reflected light in the switching system and an external port selector.

FIG. 6 is a block diagram of a structure for providing a reflected light measuring function by combining a personal computer (PC) 801 that operates as a portable terminal with stored software such as a reflected light measuring program 870', an optical switching system 300, outboard devices including a reflected light meter 800 and a port selector 830. The personal computer 801 executes the reflected light measuring program 870' using an I/O cable 877-1 to send a reflected light measuring command to the optical switching system 300, the port selector 830, and the reflected light meter 800 through a bus 877 to measure reflected light.

The reflected light meter 800 includes a laser diode or other electronic device as a light source 820 for generating test light. The optical signal 880-2 is transferred to the optical switching unit through a port 925-1, for example, which is selected in the port selector 830. The port selector 830 receives reflected light 885-1 from a port 930-1 of the optical switching unit, and transmits it back to a reflected light separating unit 825 in the reflected light meter 800 via a port 915.

A control unit 840 in the port selector 830 controls the port selecting unit that selects a port in accordance with command information sent via a bus 877; an I/O unit 835 is connected to the system control and monitoring unit 850 and reflected light meter 800 via the bus 877.

A control and monitoring unit 810 in the reflected light meter 800 monitors reflected light 885-4 that has been separated in the reflected light separating unit 825 in the optical detector 815, and supervises the monitored signal. The control and monitoring unit 810 controls inside the reflected light meter 800 in accordance with the command information sent via the bus 877, and it can also store the reflected light measuring program 870'.

The system control and monitoring unit 850 in the optical switching system 300 comprises an I/O unit 855 that sends measurement commands to the reflected light meter 800 and the port selector 830 that are outboard equipment, an I/O unit 899 that sends switching commands to the optical switching unit 851 in the optical switching system 300, a CPU 860 that globally controls the optical switching system 300, a switching information memory 865 that stores the optical interconnection relationships in the optical switching unit, and the optical reflection alarm information memory 875 that stores the optical reflection alarm control table shown in FIGS. 13A and 13B and stores alarm information on reflected light that is transmitted from the reflected light meter; these elements are interconnected via a bus 856 etc. If the optical switching unit 851 is equivalent to the unit comprising a plurality of circuit boards shown in FIGS. 3 and 4, the switching information memory 865 stores the interconnection control table shown in FIG. 14. The reflected light measuring program 870', including a testing program for measuring reflected light, can also be provided within the optical switching system 300. In that case, the program issues measuring commands to be executed by the port selector 830 and the reflected light meter 800 to be executed and controls the optical switching unit with reference to the test results obtained from the reflected light meter 800 via bus 877. Output ports 935-1 to 935-4 of the optical switching unit are terminated in the optical isolator and other components during measurement.

Figure 12:
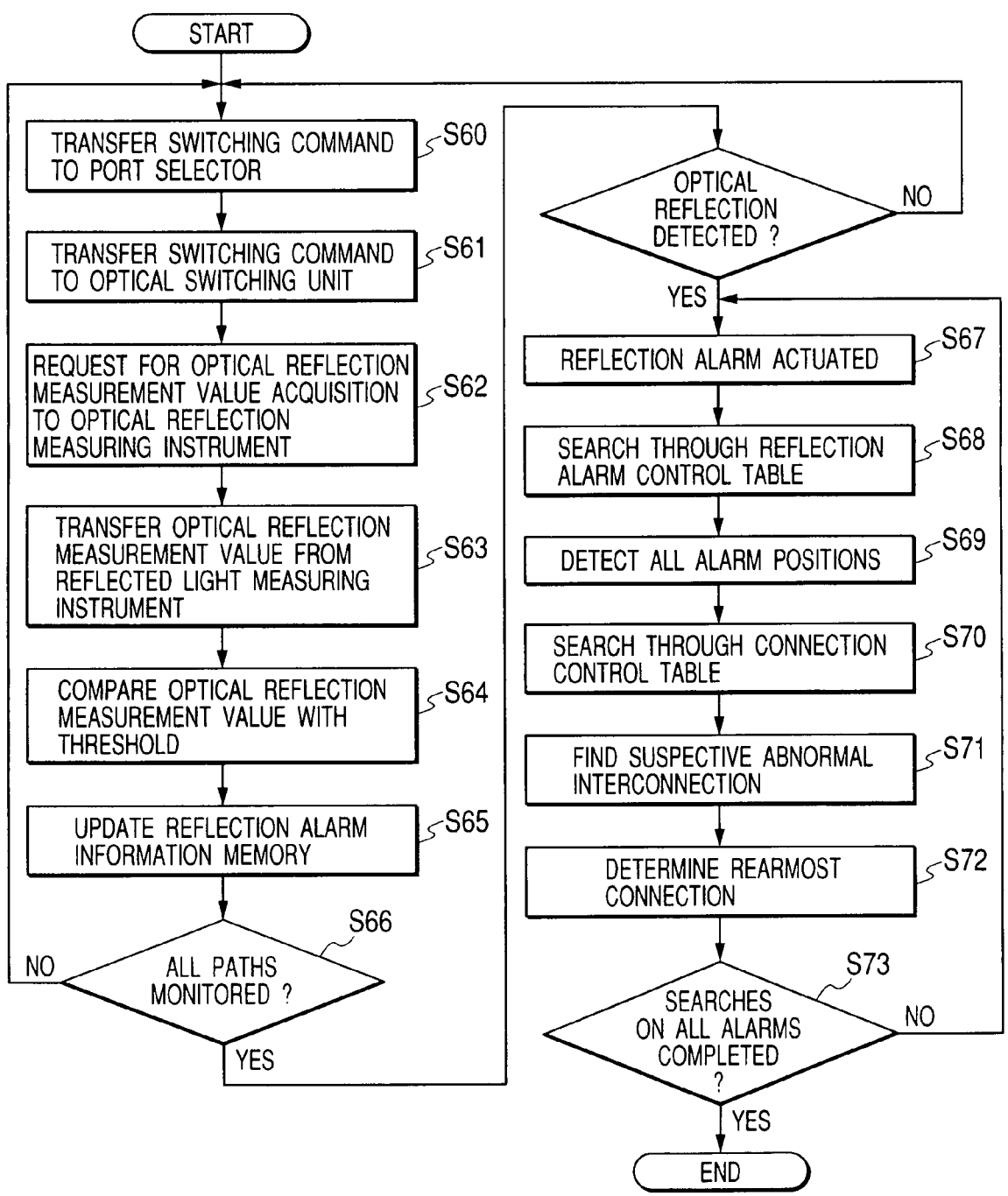
FIG. 12 is a flow diagram of operations based on the exemplary structure shown in FIG. 6 according to the present invention.

FIG. 12 shows a flow diagram of operations in each block that operates under control of the CPU 860 in the reflected light measuring system shown in FIG. 6. In an environment in which the reflected light measuring program is executed on the personal computer 801, the CPU 860 in the optical switching system 300 transfers a switching command to the port selector 830 (Step S60); transfers the switching command to the optical switching unit (Step S61); sends the reflected light meter 800 a request to acquire a reflected light measurement value (Step S62); receives the reflected light measurement value transferred from the reflected light meter (Step S63); then compares the reflected light measurement value with the threshold stored in the optical reflection alarm information memory 875 or the CPU 860 (Step S64): if the measurement value is not smaller than the threshold, writes "1" indicating an abnormal condition, or otherwise, writes "0" indicating a normal condition into the optical reflection alarm information memory 875, thereby updating the memory (Step S65); if measurements have been completed for all paths in the optical switching unit (Step S66), references the optical reflection alarm information memory 875; and if there is a reflection alarm, sets a reflection alarm indication (Step S67), or otherwise, returns to the starting point. After that, the CPU 860 searches a table similar to the optical reflection alarm control table in FIGS. 13A and 13B that indicate the conditions (indicated as normal or abnormal) of reflected light on each input and output port of the optical switching unit 851 (FIG. 6) (Step S68), detects all optical reflection alarm positions in the abnormal conditions (Step S69), searches a table similar to the interconnection control table in FIG. 14 that indicates interconnection status on each input and output port of the optical switching unit 851 (FIG. 6) (Step S70), selects suspected abnormal cable connections (Step S71), and determines the rearmost interconnection having reflection in its connection cable (Step S72). If searching of all optical reflection alarms is completed, the CPU 860 terminates the operation; otherwise, it returns to Step S67.

As described above, the present invention simplifies the detection of optical reflection causing degradation of signals, and consequently simplifies the installation and maintenance of the system. In addition, it becomes possible to provide functions enabling reliable and immediate detection and notification of reflected light in optical switching system configured by combining a plurality of optical components. Furthermore, the invention provides a method of reliable and immediate detection and notification of reflection in an optical switching system.

It also becomes possible to provide optical switching systems with higher reliability, availability, and serviceability in a simplified configuration in which reliable and immediate detection and notification of reflected light makes possible the switching of optical signal paths and recovery actions (maintenance) including replacement and repair of components.

It also becomes possible to provide a method enabling reliable and immediate detection and notification of reflected light arising in an optical switching system with simpler procedures, and improve the reliability, availability, and serviceability of the system.

Furthermore, combination with an optical reflection prevention circuit (isolator) makes it possible to confine reflecting positions within a certain range, and the use of circulators can improve utilization efficiency and facilitate design of optical power monitors.

In addition, if a circulator is used, it can also function as a reflection prevention circuit.

What is claimed is:

1. A method of detecting an optical reflection position in an optical switching unit by using a measuring system including a reflected light meter having a light source for emitting a test light, a port selector for selectively supplying the test light to one of the input ports of the optical switching unit, and a portable terminal connected to a control unit for controlling the optical switching unit, the control unit being coupled to said reflected light meter and said port selector through a bus, the method comprising the steps of:

giving a first switching command to said port selector from said control unit under control of said portable terminal so as to input the test light emitted from said light source to specified one of input ports of said optical switching unit;

giving a second switching command to the optical switching unit from said control unit under control of said portal terminal so that the optical switching unit changes an Internal path for conducting the test light supplied to said specified input port to one of the output ports of the optical switching unit;

measuring, by said reflected light meter, the magnitude of a reflected light which is generated when a part of said test light reflects at any abnormal position on the internal path and arrives at the reflected light meter through said port selector; and notifying said control unit of a reflected light measurement value from said reflected light meter, wherein said control unit performs the steps of:

comparing the reflected light measurement value obtained from said reflected light meter with a threshold value;

storing into a memory, as status information of said internal path, an abnormal state flag when the reflected light measurement value is not smaller than the threshold value and a normal state flag when the reflected light measurement value is smaller than the threshold value; and locating an abnormal position within the optical switching unit based on said status information stored in said memory after said comparing step has been completed about a predetermined number of internal paths formed in the optical switching unit by repeating said giving steps of said first switching unit by repeating said giving steps of said first switching command and said second switching command, wherein said control unit stores said status information in said memory in the form of a reflection alarm information table in which said abnormal flag or said normal flag is stored in association with each of said internal paths, and wherein said control unit detects a rearmost connection among said optical interconnections in the optical switching unit as said abnormal position based on said reflection alarm information table and said interconnection control table.

2. The method according to claim 1, wherein said control unit stores said status information in said memory in which a value "1" indicating said abnormal flag or a value "0" indicating said normal flag is stored in association with each of said internal paths.

3. The method according to claim 1, wherein said control unit generates said first switching command and said second switching command in accordance with an interconnection control table defining all optical interconnection relationships between said input ports and output ports of the optical switching unit.

4. The method according to claim 3, wherein said control unit stores said status information in said memory in the form of a reflection alarm information table in which said abnormal flag or said normal flag is stored in association with each of said internal paths, and said control unit detect said abnormal position based on said reflection alarm information table and said interconnection control table.

* * * * *